(12) United States Patent
Harvey

(10) Patent No.: US 10,524,412 B1
(45) Date of Patent: Jan. 7, 2020

(54) ERGONOMIC GARDENING IMPLEMENT

(71) Applicant: Robert Harvey, Greers Ferry, AR (US)

(72) Inventor: Robert Harvey, Greers Ferry, AR (US)

( * ) Notice: Subject to any disclaimer, the term of this patent is extended or adjusted under 35 U.S.C. 154(b) by 5 days.

(21) Appl. No.: 14/256,986

(22) Filed: Apr. 20, 2014

(51) Int. Cl.
| | |
|---|---|
| *A01D 7/00* | (2006.01) |
| *A01D 11/06* | (2006.01) |
| *A01B 1/02* | (2006.01) |
| *A01D 9/00* | (2006.01) |
| *A01B 1/22* | (2006.01) |
| *A01B 1/20* | (2006.01) |

(52) U.S. Cl.
CPC .............. *A01D 11/06* (2013.01); *A01B 1/02* (2013.01); *A01B 1/20* (2013.01); *A01B 1/227* (2013.01); *A01D 7/00* (2013.01); *A01D 9/00* (2013.01)

(58) Field of Classification Search
CPC ..................................... B25G 1/00; B25G 1/10
USPC ........... 56/400.04, 400.01; 294/49, 55.5, 180
See application file for complete search history.

(56) References Cited

U.S. PATENT DOCUMENTS

| | | | | |
|---|---|---|---|---|
| 1,367,032 A | * | 2/1921 | Ferdon ................... | A47J 43/288 15/236.01 |
| 1,456,455 A | * | 5/1923 | Luukkonen .............. | A01D 9/04 294/55.5 |
| 1,458,987 A | * | 6/1923 | Della Monica ........ | A01B 1/227 294/55.5 |
| 1,479,054 A | * | 1/1924 | Chladek ................... | A01D 9/02 294/55.5 |
| 1,662,500 A | * | 3/1928 | Henneck ................... | B25G 3/02 294/57 |
| 3,115,740 A | * | 12/1963 | Hartley ................... | A01D 51/00 294/57 |
| 3,226,149 A | * | 12/1965 | McJohnson .............. | A01B 1/02 172/375 |
| 3,767,249 A | * | 10/1973 | Rogers ..................... | A01B 1/00 294/49 |
| 4,791,780 A | * | 12/1988 | Phillips ...................... | 56/400.04 |
| 4,865,373 A | * | 9/1989 | Hudson ........................ | 294/54.5 |
| 5,060,343 A | * | 10/1991 | Nisenbaum ..................... | 16/421 |
| 5,165,144 A | * | 11/1992 | Nisenbaum ..................... | 16/421 |
| 5,533,768 A | * | 7/1996 | Mitchell ...................... | 294/54.5 |
| D391,132 S | * | 2/1998 | Gandee et al. .................. | D8/13 |
| 5,791,006 A | * | 8/1998 | Anctil .......................... | 15/144.4 |
| 5,810,408 A | * | 9/1998 | Armstrong ............... | A01B 1/00 16/422 |
| 5,816,633 A | * | 10/1998 | Odom ....................... | A01B 1/00 172/375 |

(Continued)

*Primary Examiner* — Thomas B Will
*Assistant Examiner* — Mai T Nguyen
(74) *Attorney, Agent, or Firm* — William S. Parks

(57) ABSTRACT

A specifically configured gardening implement including an arced extension between the handle and the tool component. Such an implement permits greater versatility and facilitates typical gardening operations without losing any tool-using capabilities. Such an arced extension leads from a standard elongated, straight handle to the edge of a tool component, providing an ergonomic disposition of the tool in relation to the handle itself. In such a manner the arced extension allows for greater reach from a standing position, as well as the ability to adjust the actual handling of the overall implement to different angles without the need for uncomfortable and/or possibly. harmful repositioning by the user, as well. The inclusion of different tool components within the base handle/extension structure are also encompassed within the invention.

7 Claims, 5 Drawing Sheets

(56) References Cited

U.S. PATENT DOCUMENTS

| | | | | |
|---|---|---|---|---|
| D433,890 S | * | 11/2000 | Scaringella | D8/13 |
| 6,170,112 B1 | * | 1/2001 | Mayfield et al. | 15/159.1 |
| 6,199,245 B1 | * | 3/2001 | Blessing | 16/430 |
| 6,684,459 B2 | * | 2/2004 | Dickhaus | 16/430 |
| 7,300,081 B1 | * | 11/2007 | Murray et al. | 294/58 |
| 8,375,499 B1 | * | 2/2013 | Marino | B25G 1/102 |
| | | | | 15/143.1 |
| 2003/0116982 A1 | * | 6/2003 | Nicolay | B25G 1/00 |
| | | | | 294/57 |
| 2004/0055099 A1 | * | 3/2004 | Greenberg | B25G 1/102 |
| | | | | 15/143.1 |
| 2005/0242597 A1 | * | 11/2005 | Demar | A01D 7/02 |
| | | | | 294/55.5 |
| 2005/0242599 A1 | * | 11/2005 | Demar | A01B 1/024 |
| | | | | 294/60 |

* cited by examiner

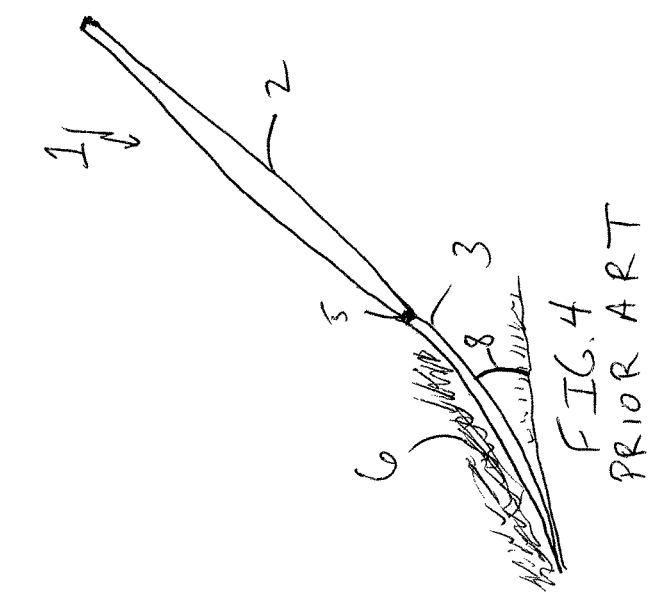
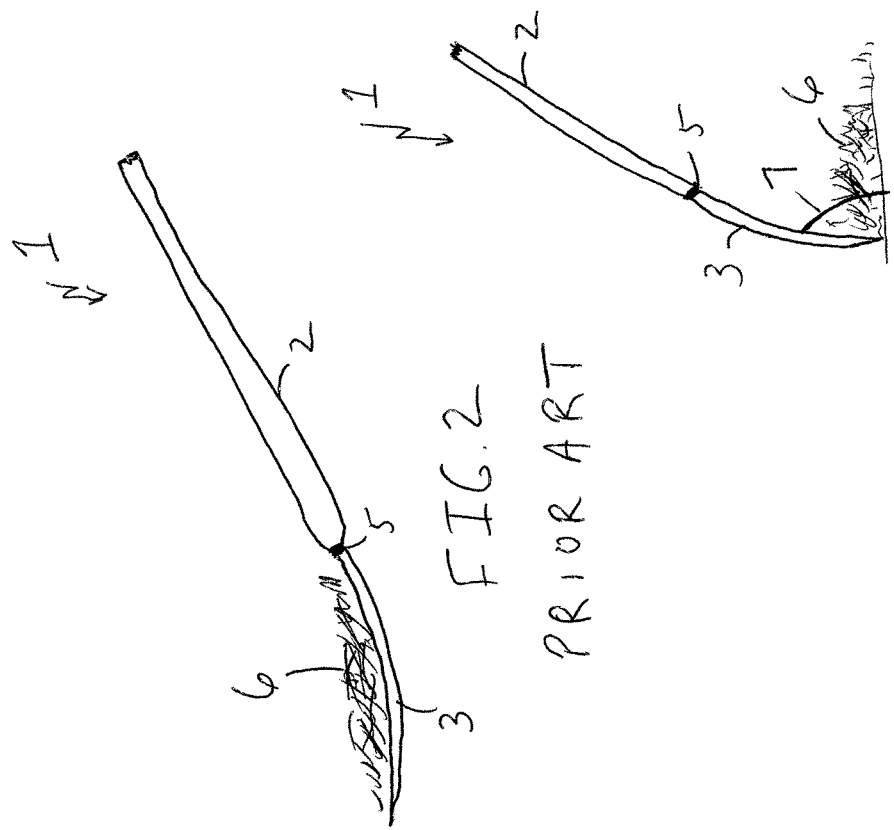

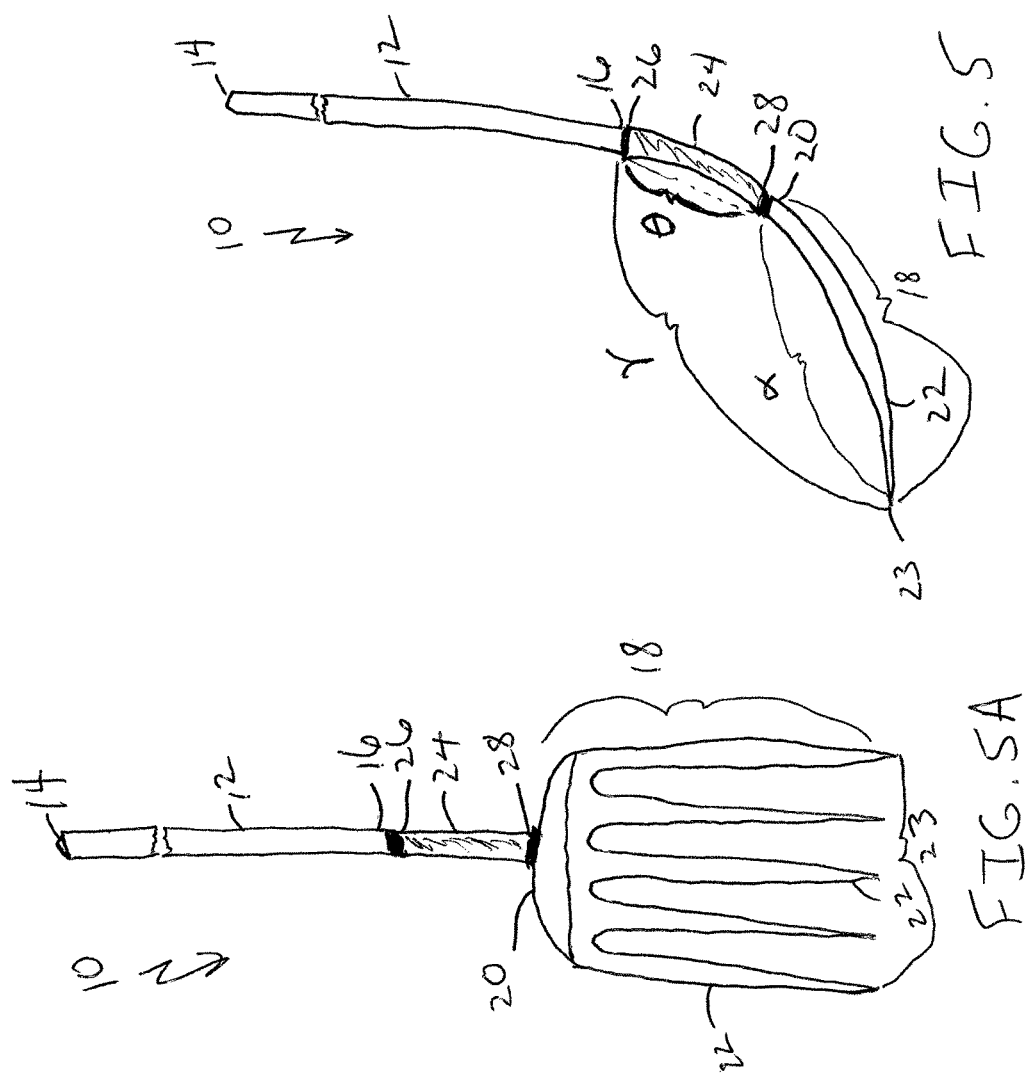

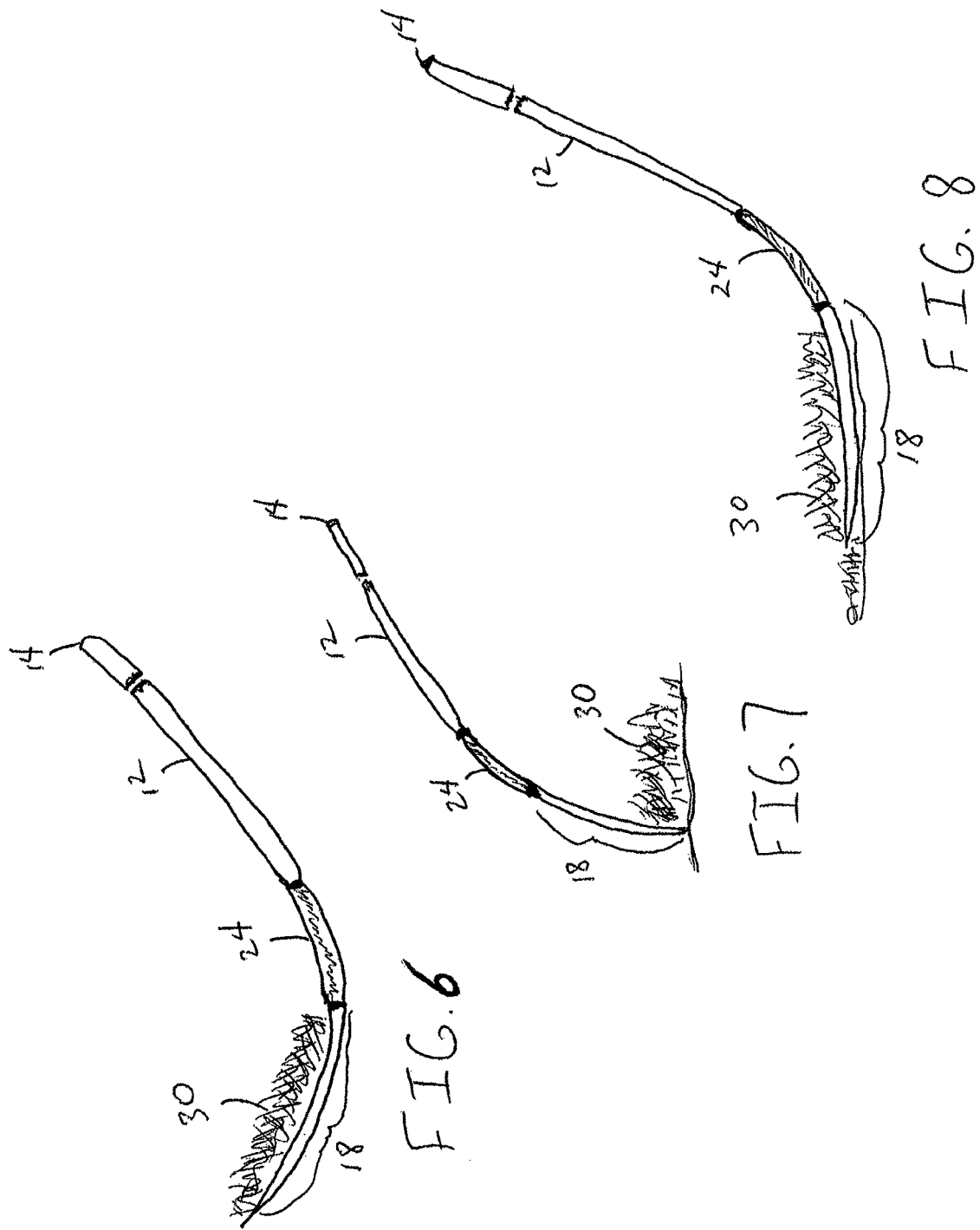

ERGONOMIC GARDENING IMPLEMENT

FIELD OF THE INVENTION

The present invention relates to an specifically configured gardening implement including an arced extension between the handle and the tool component. Such an implement permits greater versatility and facilitates typical gardening operations without losing any tool-using capabilities. Such a curved extension leads from a standard elongated, straight handle to the edge of a tool component, providing an ergonomic disposition of the tool in relation to the handle itself. In such a manner the curved extension allows for greater reach from a standing position, as well as the ability to adjust the actual handling of the overall implement to different angles without the need for uncomfortable and/or possibly harmful repositioning by the user, as well. The inclusion of different tool components within the base handle/extension structure are also encompassed within the invention.

BACKGROUND OF THE INVENTION

Gardening tasks and activities have always proven to be highly intensive and physically demanding. The actions and operations needed to manually undertake raking, shoveling, transferring, and the like, lawn debris (such as mulch, leaves, mown grass, etc.) require repetitive motions that are rather strenuous on the muscles of the body. Continuous movements of the same basic type in order to accomplish lawn care services have thus proven to cause various injuries from strained and torn muscles (in various regions of the body) to carpal tunnel problems and even back damage, particularly with the typical need to bend in different directions and to lift differing weights with a long handle. If a person is already injured, with, for instance, reduced movement capability in his or her arms, such activities are, with the current tools and implements available for such purposes, incredibly difficult, as well.

Notably, for instance, pitchfork-type implements needed to manipulate, shovel, push, and transport mulch, hay, and yard debris, at least, are configured with a straight handle and a multi-tined fork structure that is generally aligned at a minimal angle and/or arc at the base of the handle portion. Such a configuration thus allows for reach by the user (through the long, straight handle) and the tined structure allows for access beneath target mulch and/or lawn or yard debris, at least, in order to lift and transport such materials (as well as pick apart clumped materials through the insertion and manipulation of the tines). The problem with this commonly configured pitchfork-type implement is that the access point is set a specific distance and angle from the user. In order to adjust the capability and capacity of such a tool to allow for greater leverage and stability for greater loads of transferred materials, as well as reduce the stress on the user's back due to such a specific angle, the user must adjust his or her stance and/or location of grip on the handle. In either situation, the effort needed to properly pick up and move such loads with the typical straight-handled, minimally angled tine structure pitchfork-like implement is inordinately high such that the repetitive actions followed to transfer the necessary amounts of mulch, hay, yard debris, (and the like) through required actions (e.g., shoveling, lifting, moving, and delivering motions) to accomplish the entire target chore at hand, lead quite easily to exhaustion and, as noted above, potential injury (instant or chronic). Thus, an implement of this type that could reduce the stress on the user (muscular and otherwise) during actual operations while still permitting delivery of the maximum amount of materials in trustworthy fashion would be quite desirable.

Furthermore, as alluded to above, individuals that have injured or weakened their muscular system (such as through strains or even muscle tears or even broken bones, for instance) are certainly more susceptible to further complications if such typical gardening (landscaping) implements are utilized. In essence, such persons are at the mercy of the standard completely straight handled tools (whether rakes, shovels, pitchforks, and the like), thereby necessarily having to utilize such implements at potentially difficult angles and stances to accommodate for the awkward positions and grips associated with completely straight-handled tools. Again, such repetitive motions within the strictures of these operations can lead to greater levels of injury.

There have been very few modifications to such straight-handled implements within the gardening/landscaping tool art, ostensibly because of the simplicity of manufacture involved. Of the rare modifications to such standard structures, the only types that have been provided from an ergonomic perspective for the user have involved sharp-angled portions that provide a direct lead to a level fork (or rake) end structure or long and broad convex curves within the actual handle itself. In terms of the sharp-angled types, such modified implements include the initial straight handle component, but then include a sharp angle at the handle base that leads to the tool end (and in "convex" relation to the tool)(as in U.S. Pat. No. 5,878,563 to Dutcher). This specific structure is associated solely with rake implements and, as such, are limited in actual usefulness to a straight raking operation alone. Additionally, however, the tool end is provided at a straight edge aligned with the direction and plane of the tailing end of the angle. Thus, although there is provided some degree of modification that allows for differing grips and/or stances by the user to generate potentially greater leverage during actual use, the flattened tool structure end actually limits the versatility of the implement as the user must still compensate for the straight-edge portions, even if an angle is present disposing both the handle and the tool ends in different planes. Additionally, such a configuration as in Dutcher cannot be utilized for any other type of implement other than a rake; such a tool would not provide any benefits in terms of improved shoveling, lifting, transferring, and the like, activities.

The other type, with the convex handle itself, as in WO1989/011213A1 to Cederqvist, is limited to a broad curvature portion to reduce muscular strain for a user during gardening, etc., activities, apparently. Such a structure, however, creates not only difficulty to the user to view the target materials involved (since the curved extends upward and impedes the sight line of the user) but requires the user to place his or her hands along a raised handle (with differing heights at each location) to manipulate the implement itself. Additionally, such a curved handle does not take into consideration any connections at the tool portion interface, only at the handle portion. Thus, there is limited benefit provided with such structural modifications, and all to convex adjustments.

As such, even though some ergonomic implements have been proposed in the past, there still remains a distinct need for implements of this type that accord greater mobility, range of motion, and capacity to carry and transport such materials quickly and effectively wherein the user can adjust his or her leverage easily and accordingly without need for drastic muscular accommodations. In such a manner, then, not only would such an ergonomic result actually be provided this industry, but also a means for such a user to reduce the time and effort required to complete such manual and, generally, strenuous tasks, which, in turn, reduces the time needed for such actual strenuous activities overall.

Thus, there remains a significant problem that has yet to be properly addressed within the gardening/landscaping manual tool industry. To date, as noted above, the only remedies to these straight-handled implements have focused on angled linkages between the handle and the tool structure which do not accord the requisite degree of ergonomic relief necessary (and such angled elements also encumber certain manipulation procedures, rather than actually help in such a respect). Importantly, then, the present invention overcomes each of these noted deficiencies.

Advantages and Summary of the Invention

It is an advantage of the present invention to provide a reliable ergonomic gardening/landscaping implement that allows for greater range of movement and permissible leverage for a user than typical tools. It is an additional advantage that the inventive implement is of relatively straightforward manufacture with standard tool handle and actual tool portion components. Yet another advantage of this invention is the capability of such a tool to permit a variety of different gardening/landscaping operations without any appreciable change in muscular activity by the user. Additionally, this invention provides the advantage that the new configuration may be introduced within any type of gardening/landscaping implement (such as a rake, shovel, pitchfork, and the like) that typically involves utilization by a user from a prone, standing position to alleviate back and arm concerns when repetitively operated.

Accordingly, the present invention encompasses a gardening/landscaping implement including a handle portion having a top end and a bottom end, wherein said at least said bottom end of said handle portion is configured in a substantially straight direction, a tool portion having a connecting end and a tool end, wherein said tool end is selected from the group consisting of a rake component, a pitchfork component, and a shovel component, and a connecting curved portion having a top end and a bottom end, wherein said top end of said connecting curved portion is connected to said bottom end of said handle portion and wherein said bottom end of said connecting curved portion is connected to said connecting end of said tool portion. Furthermore, the invention encompasses the same implement wherein the connecting curved portion is configured in concave relation to the tool portion. The invention further includes the same implement as noted above wherein the connecting curved portion exhibits an arced angle from its top end to its bottom end of from 8 to 20°, preferably from 10 to 15°, and most preferably about 11'; and wherein the disposition of the bottom end of said handle portion in relation to the connecting end of said tool portion is measured to be an angle within the range of 15 to 30°. Furthermore, the invention also encompasses a pitchfork implement wherein the tool portion is curved itself at an angle of about 7 to 10° from the connecting end thereof.

Such an implement, as alluded to above, allows a user the capability to manipulate, lift, and transport soil, mulch, leaves, yard debris, and the like, in a more reliable manner than standard straight-handled tools. As well, this curved connector component facilitates movement along the ground with a smooth operation (as opposed to the difficulties inherent with sharp-angled bends), thus permitting not only the ability to maneuver such gardening/landscaping materials through a forward pushing motion, but the ability to do so with the user closer to the ground and/or bent at less taxing angle to attain the correct leverage for such an action. With pitchfork implements, in particular, and thus the presence of multi-tined tool structures for the actual gardening/landscaping material contact and manipulation activities involved, this inventive concave configuration is a significant improvement over both the straight-handled (and thus implements with slight angled tool portions, but no other curvature within the handle, and certainly not within a connection portion between the handle and the tool portion) and sharp-turned handle implements (which exhibit a straight handle but a convex sharp angle leading to the tool portion). Again, in comparison with these prior tools, the inventive configuration permits a greater degree of control for the user to manipulate, etc., such yard debris, mulch, and the like, materials. Basically, such an effect can be considered in relation to a person's arm and hand. If the arm is extended from the body with the palm upward, the straighter and more direct the alignment of both the arm and hand, the more difficult it is for the person to properly manipulate items without further moving the disposition angle of the hand (palm) itself, thereby relaying on the actual lifting of the arm to greater heights to ensure the palm retains any items placed thereon. In this manner, then, the length of the arm, coupled with the weight and size (and structure) of the items themselves, dictates the torque necessary to lift the arm without losing control of the held items. If the person simply cups the palm (analogous to standard gardening tools with a straight handle and a slightly curved tool, such as a pitchfork, as alluded to above), there is greater capability to hold items therein, certainly; however, in order to properly manipulate the items to desired heights and/or locations, the arm would, again, necessarily be adjusted with relatively high torque requirements to again ensure retention of the held items and proper transfer to desired locations, and the back would require bending to a certain degree for such a purpose, as well. Sharp-angled convex configurations between the handle and the tool portion exhibit certain limitations along the same lines as the drastic turn in the handle end creates an angular disposition that must be compensated for when weight is applied to the tool portion through manipulation at the handle location. In other words, even with an increase in potential control at the tool portion (e.g., greater capability to reliably retain held items) with this sharp-turn handle configuration, the direction in which the items are actually kept would still require more manipulation action at the handle to ensure retention. The convex disposition thus actually creates greater difficulties that the concave configuration of the present invention remedy. In essence, in these convex structures, the straight line of the handle bends to another straight line angled downward in relation to the tool portion. These straight line sequences create two separate instances that require leverage compensations by the user. Even if the sharp-turn configuration brings the tool portion closer to the user, and thus potentially easier for materials manipulation, the sharp bend aspect again creates uneven weight distribution results that, again, require the user to react appropriately when in use. As well, other benefits available with a concave structure (as in the present invention) are not possible with this convex configuration. For instance, if the user tries to push forward such materials on the ground (as opposed to shoveling and lifting alone), the tool must be turned over (to permit the rake or fake portion to collect and force forward the target materials); however, the sharp-turned configuration prevents such a possibility as the angled portion will drive into the ground, rather than sliding across it.

To the contrary, the inventive structure as defined above, accords the user far greater freedom of use as well as less strain on the user. The connecting curved portion provides the means to gradually introduce a steeper curve between the handle and the tool portion itself, rather than introducing the curve within the tool portion alone. In this manner, the greater area for control is in place, and a wider platform, in essence, is permitted for not only greater control of greater amounts of soil, mulch, etc., materials to be picked/scooped up (if as a shovel or pitchfork, for instance), but the torque required of the user's muscle to manipulate and/or lift such an implement is reduced from that needed with utilization of a long, straight-handled type. Additionally, this curved extension allows for the implement to be turned over and properly utilized to reach and pull towards oneself such target materials with less strain on the back and arms than for straight-handled pitchforks and shovels. Furthermore, the curved connecting portion actually permits a steeper angle of use when the tool portion is situated on the ground in order to slide the implement forward. In this way, target materials may be easily pushed (rather than pulled or raked towards such a person) away to desired locations with the ability to stand more upright (as opposed, again, to straight-handled implements with slightly curved tool portions; the entirety of the handled length must be taken into account, basically, such that a lower stance is necessary to place the curved tool portion on the ground).

In comparison, a typical rake would require a substantially straight handle leading directly (or, in the Dutcher patent, angled downward) to the rake tool. This tool is typically configured straight from the handle (or the handle end portion including the downward bend) and includes bent tines at the very end. If such is turned over, the tine openings are usually very broad (and thus will not easily hold target materials) or of thin, flexible constitution such that pushing upside down on the ground would not be efficient. Even comparison with, for instance, a hoe implement that is turned upside down shows the difficulties in providing effectiveness in either direction. In order to hold yard debris, mulch, etc., materials on the hoe tool portion in that arrangement, the handle would be held perpendicular to the ground (and thus plane of the hoe wall). If tilted for easier handling by the user, any materials placed on the hoe wall would easily slide off, thus defeating such a purpose. As such, then, the inventive configuration provides an excellent platform to manufacture a pitchfork, a shovel, and even a rake that feature a larger and more effective angle between tool portion and handle for not only easier and less strenuous handling during use, but greater versatility with such ergonomic benefits. This greater angle thus allows the user greater control to actually scoop up such yard materials with more dexterity than typical straight-line pitchforks with curved tines. The comparison configuration of the inventive implement imparts a "cup" structure with the extra curve portion present, according, again, far greater control and, at least, far reduced propensity for materials to fall from such a "cup" structure during use (as well as less chance of losing such materials due to wind or other like environmental challenges).

The inventive implement thus includes at least one handle having a top end and a bottom end. Such a handle may be constructed of any material, including wood, metal, polymer, and even combinations thereof, and may be straight (in effect, cylindrical for the most part) or curved (as in Cederqvist, noted above), if desired.

This handle portion leads to a connecting curved portion that may be of metal or polymer construction, as well. Basically, such a connector may be a metal sleeve that is wide enough to allow insertion of the handle bottom end therein (and to be secured in such a manner, as well, such as through adhesives, screws, staples, bolts, and the like). This top end of the connecting curved portion thus leads to the bottom end thereof that connects with the top of the tool portion. The curved connector is thus constructed to include the gradual curve discussed above. This curve is, as its name implies, an actual curve, not a sharp bend. The angle provided by such a curve is measured as the angle exhibited between the handle direction at its bottom end and the tool portion direction at its top end (particularly since these locations are the standards for such a purpose; if the standard straight-handled implement were measured for this type of issue, the angle would invariably be 0° since the direction of the handle at its bottom end would be in the same plane as the tool portion top end. Here, however, the connecting curved portion accords a range of disposed angles that have heretofore not been provided in this industry. Thus, an angle between handle bottom end direction and tool portion top end direction is to be from 8 to 20°, preferably from 10 to 15°, and most preferably about 11°. It is this curvature that is required to accord the unexpected benefits described herein.

The tool portion may be one of a pitchfork tool, a shovel tool, or a rake tool. Such tool portions should be constructed of suitable resilient materials to permit reliable and consistent (and continuous) use as a gardening/landscaping implement. Thus, with pitchfork and shovel tools, the entirety of such a structure should be metal (such as steel, aluminum, etc.); for rakes, the tines may be metal or plastic in nature. If the tool is a pitchfork, the general structure would be of a transverse (or curved) main tine structure that includes the connection means (post, insert, bolts, screws, etc.) to allow for resilient connection with the connecting curved portion (and thus situated at the top edge of said tool portion). This transverse main tine may then lead perpendicularly to the remaining tines of the tool portion (at least substantially, as some disposition that is not completely perpendicular thereto may be possible) or actually serve as the two outer tine structures by curving from one end to the other and having both ends thereof be substantially parallel to the remaining tine structures. Such tines include, preferably, though not necessarily, points on their open ends to allow for puncture or like actions to be taken with certain gardening/landscaping materials. As well, such tines may also exhibit a curve therein from their connection with said main tine structure. This curve is typically concave in nature and allows for the tines to create a slight bowl-like (also referred herein as a scoop or "cup") configuration within the tool portion itself to provide the potential for greater control of placed materials thereon during use. If the tool portion is a shovel, a spade, snow shovel, or typical shovel tool structure may be utilized (and any of these implements may include curved dispositions from the bottom end of the connecting means to the actual end of the implement of the tool itself, again to allow for greater control of materials when placed thereon). This tool portion would include a connector means at its top end to engage with the bottom end of the connecting curved portion. If the tool portion is a rake, then the same connection requirements would be in place (proper engagement permitted between the bottom end of the connecting curved portion and the top end of the tool portion), including, if needed, an insertion component for introduction of the connection portion bottom end. Such a rake may be a flat configured plate with individual tines protruding therefrom in alignment with one another. Alternatively, the rake tool may be a claw-type structure with multiple parallel tines disposed substantially perpendicularly to the tool portion top end. In either case, the curved connecting portion allows for less strain to the user when operated for typical gardening/landscaping purposes.

BRIEF DESCRIPTION OF THE DRAWINGS

FIG. 2 depicts the prior art pitchfork of FIG. 1 in a lift operation.

FIG. 3 depicts the prior art pitchfork of FIG. 1 in a raking operation.

FIG. 4 depicts the prior art pitchfork of FIG. 1 in a forward pushing operation.

FIG. 5 depicts a side view of one potentially preferred embodiment of a pitchfork implement of the present invention.

FIG. 5A depicts a front view of the inventive pitchfork of FIG. 5.

FIG. 6 depicts a view of the pitchfork implement of FIG. 5 in use in a scoop and lift operation.

FIG. 7 shows a view of the same pitchfork implement of FIG. 5 in use in a raking operation.

FIG. 8 shows a view of the same pitchfork implement of FIG. 5 in use in a forward pushing operation.

DETAILED DESCRIPTION OF THE DRAWINGS AND PREFERRED EMBODIMENTS OF THE INVENTION

The following drawings and descriptions are not intended to limit the scope of the invention in any manner and are simply provided as non-limiting examples thereof.

Figure 1:
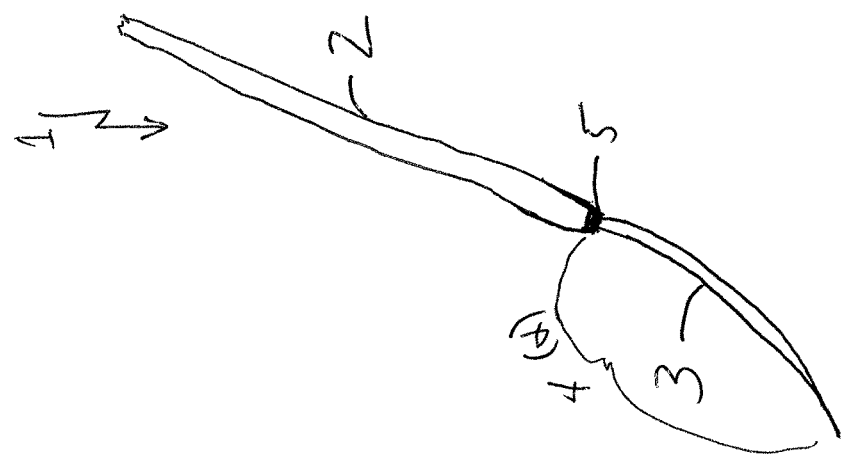
FIG. 1 depicts a side view of a prior art pitchfork of straight handle, curved tine structure.
Figure 1A:
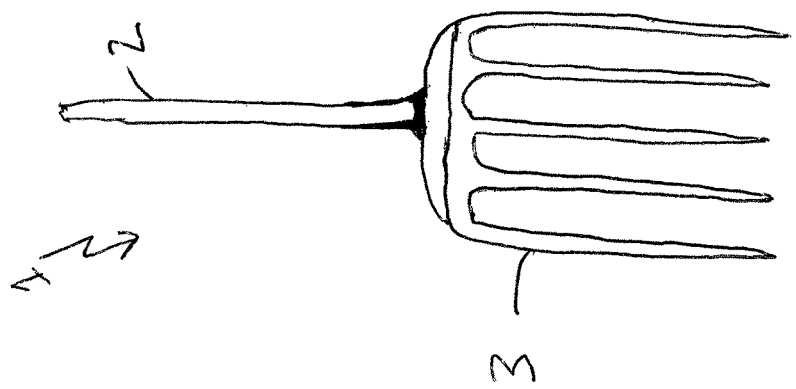
FIG. 1A depicts a front view of the prior art pitchfork of FIG. 1.

FIGS. 1-4 (including FIG. 1A) show a prior art pitchfork 1 with a straight handle 2 and curved tines 3 (having a curvature from the handle of $\alpha$, being ostensibly the same curvature for the tool portion of FIGS. 5 and 6-8, below) at the end thereof. Such a curvature may be between 5 and 15°, here roughly 5. Such a pitchfork 1 thus exhibits a limited curve 4 directly at the handle/tines interface 5. In operation, as in FIGS. 2-5, the pitchfork 1 is limited in its capabilities of carrying yard debris 6 (FIG. 2), raking debris 6 at a steep angle 7 (FIG. 3), and pushing debris 6 at a flat angle 8 (FIG. 4). In any such operation (FIGS. 2-4), the user must utilize greater torque for manipulations and the lifting capacity is subject to a limited curvature at the interface 5, thus reducing the overall carrying effectiveness, requiring compensation in terms of applied forces by the user, or greater numbers of repetitive motion operations to achieve a desired debris clearance result.

In FIGS. 5-8 (including FIG. 5A), then, there is shown an inventive pitchfork 10 with a straight handle 12 with a top end 14 and a bottom end 16, a tool portion 18 with a top end 20 and multiple tines 22 having a shared bottom end 23 leading away from the handle, and a curvature $\alpha$ (FIG. 5) (as above roughly 5°). Also included is a connecting portion 24 with a top end 26 and a bottom end 28, exhibiting a curvature $\theta$ (measured between 8 and 20°, here specifically 11°). The handle bottom end 16 is durably connected to the connecting portion top end 26 and the tool portion top end 20 is connected to the connecting portion bottom end 28. The curvature $\theta$ of the connecting portion 24, coupled with the curvature of the tool portion a create an overall disposition between handle 12 and tool portion bottom end 23 with a total curvature measurement $\gamma$ (measured between 15 and 30°, here roughly 16°). In relation to the tool portion curvature $\alpha$, the curve direction of the connecting portion curvature $\theta$ is the same, although the actual angle of disposition is not necessarily the same. Thus, when held as a scoop-like pitchfork implement 10, the result is a concave disposition.

In FIG. 6, the implement 10 is provided in its scoop-like arrangement, thus allowing for pick up, lift, transfer, and placement of target gardening/landscaping materials 30. The concave disposition provided by the combined curvatures of the connecting portion 24 and the tool portion 18 provide a highly effective result in this manner with less strain on the user, and, with a more rounded base tool structure when substantially parallel to the ground, greater capacity to hold and retain such materials (particularly in comparison with the prior art depiction in FIG. 2).

In FIG. 7, the pitchfork implement 10 has been flipped over to permit use as a rake-like tool. In this manner, the curvatures of both the connecting portion 24 and the tool portion 18 work together to allow for reach and pull (dragging) target materials 30 along the ground with greater reach and less strain on the user (particularly as compared with that shown in FIG. 3, at a flatter angle).

FIG. 8 shows further versatility of this ergonomic implement 10 by placing the bottom of the tool portion 20 on the ground and pushing target materials 30 away from the user. The height of the handle is sufficient for proper manipulation by the user for such a purpose with, again, the resultant capability of operating such an implement in such a manner without the need to bend over unnecessarily as well as the greater reliability to push forward greater amounts of target materials than for other configurations (particularly that of FIG. 4, at a steeper angle in comparison).

Figure 9:
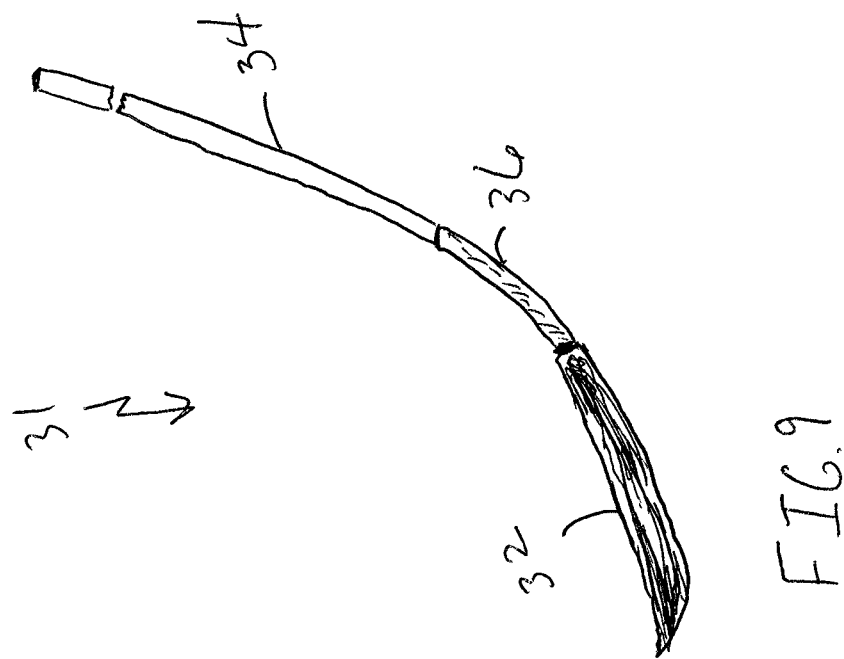
FIG. 9 depicts a side view of one potentially preferred embodiment of a shovel implement of the present invention.

FIG. 9 thus shows the similar structure but with a shovel head 32 attached to a straight handle 34 and a connector 36, as in FIG. 5 (with the similar curvature measurements). The similar benefits as described for the FIG. 5 pitchfork implement are thus available in relation to the shovel 31 depicted herein.

Figure 10:
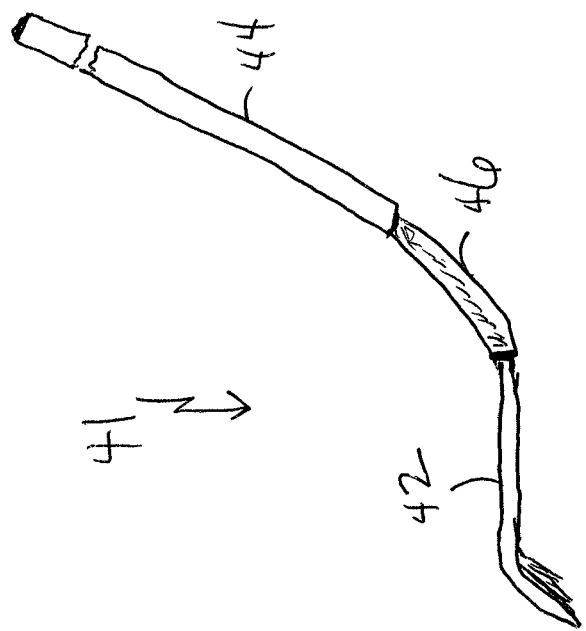
FIG. 10 depicts a side view of one potentially preferred embodiment of a rake implement of the present invention.

FIG. 10 thus shows the similar structure but with a rake head 42 attached to a straight handle 44 and a connector 46, as in FIG. 5 (with the similar curvature measurements). The similar benefits as described for the FIG. 5 pitchfork implement are thus available in relation to the rake 41 depicted herein.

Thus, when introduced between a straight handle and a typical tool portion within an integrated implement, the connecting portion accords greater material manipulation controls at more suitable disposition angles for a user. This combined result has heretofore been unexplored nor fairly suggested within the industry.

The preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

What I claim is:

1. A gardening/landscaping implement including:
   i) a handle portion having a top end and a bottom end, wherein said handle portion is configured in a substantially straight direction from said top end to said bottom end;
   ii) a tool portion having a connecting end and a tool end, wherein said tool end is one of a pitchfork component or a shovel component; and
   iii) a connecting curved sleeve portion having a top end and a bottom end;
   wherein said bottom end of said handle portion is inserted within and connected to said top end of said connecting curved sleeve portion;
   wherein said bottom end of said connecting curved sleeve portion is connected to said connecting end of said tool portion;
   wherein said connecting curved sleeve portion is separate from said tool portion;
   wherein said tool portion exhibits a curvature extending from the bottom end of said connecting curved sleeve portion to said tool end;
   wherein said connecting curved sleeve portion exhibits a curvature measured from 8 to 20° as the angle between its top end and its bottom end; and
   wherein said implement further exhibits a curvature between said bottom end of said handle portion and said tool end measured to be an angle within the range of 15 to 30°.

2. The implement of claim 1 wherein the connecting curved sleeve portion is configured in concave relation to the tool portion.

3. The implement of claim 1 wherein said curvature of said connecting curved sleeve portion is from 10 to 15°.

4. The implement of claim 3 wherein said curvature of said connecting curved sleeve portion is about 11°.

5. The implement of claim 1 wherein said implement is a pitchfork implement, and wherein the tool portion is curved itself at an arced angle of about 7 to 10° from the connecting end thereof.

6. The implement of claim 2 wherein said implement is a pitchfork implement.

7. The implement of claim 2 wherein said implement is a shovel implement.

* * * * *